G. WESTINGHOUSE.
FLUID PRESSURE DEVICE.
APPLICATION FILED SEPT. 28, 1909.
1,036,043.
Patented Aug. 20, 1912.
2 SHEETS—SHEET 2.
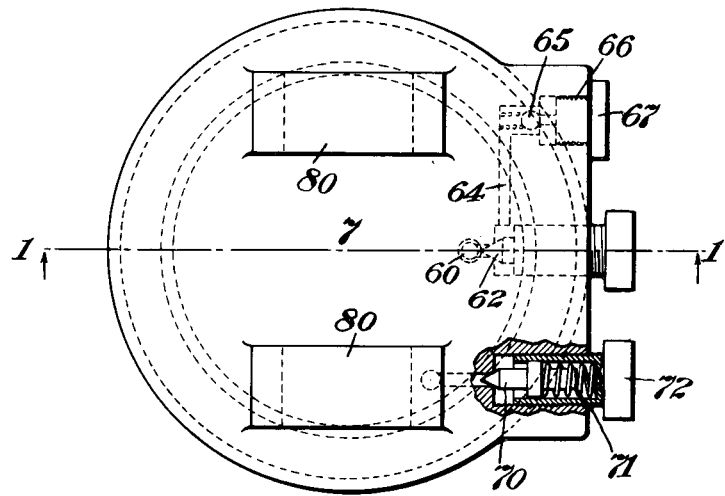
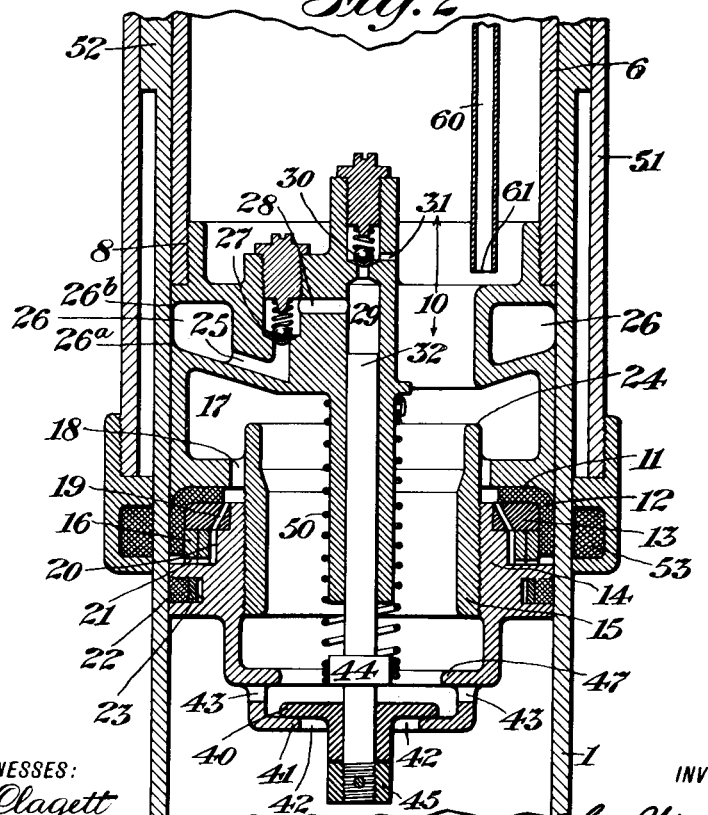
WITNESSES:
Chas. F. Clagett
INVENTOR
Geo. Westinghouse
BY
Geo. C. Dean
ATTORNEY

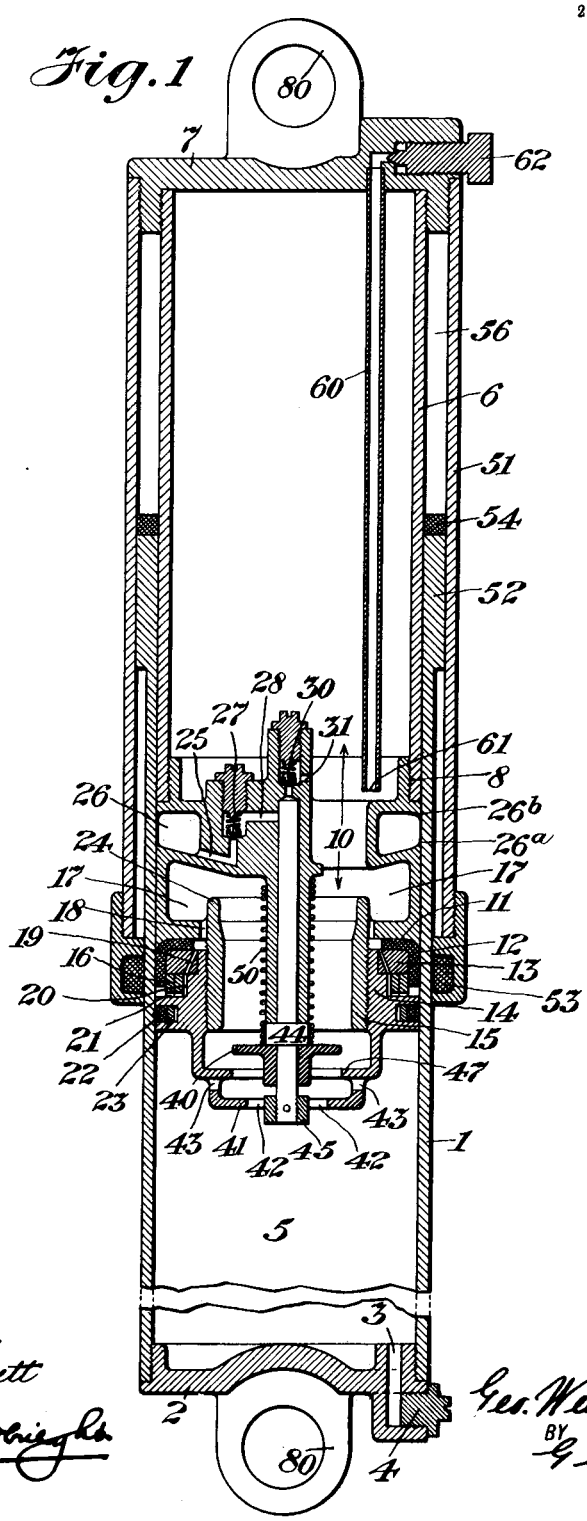

UNITED STATES PATENT OFFICE.

GEORGE WESTINGHOUSE, OF PITTSBURGH, PENNSYLVANIA.

FLUID-PRESSURE DEVICE.

1,036,043.  Specification of Letters Patent.  Patented Aug. 20, 1912.

Application filed September 28, 1909. Serial No. 520,039.

*To all whom it may concern:*

Be it known that I, GEORGE WESTINGHOUSE, a citizen of the United States, and a resident of Pittsburgh, in the county of Allegheny and State of Pennsylvania, have invented certain new and useful Improvements in Fluid-Pressure Devices, of which the following is a specification.

My present invention is shown as embodied in a fluid cushion device particularly adapted for use as a spring, which may be used in any relation where two bodies are so associated that resilient movement is desirable, and especially where one or the other of the bodies is subject to sudden movements, vibrations, or shocks which it is undesirable to have transmitted to the other of said bodies. Certain features relating to the packing and lubrication of the joint between the cylinder and the member sliding lengthwise of the same are applicable in any similar relations where high pressures are to be sustained.

It will be understood that though capable of use in other relations, the invention has been devised for use primarily in connection with automobiles, and the general object in view has been to embody the principles of resilient support by means of an elastic fluid cushion, such as air or gas in a practical, self-contained, gas-tight device capable of movement for compression and extension and adapted to serve as a spring, but to combine therewith all of the desirable features of a shock absorber, the entire device being adapted to meet the exacting conditions and to stand the rough usage required in connection with automobiles, delivery wagons, trucks, railway rolling stock, etc.

I prefer to make the devices in the form of telescoping tubes with the smaller or inner tube uppermost. The tubes are hermetically closed at the outer ends and the inner tube is provided at the inner end with peripheral packing adapted to form a fluid tight joint, and is internally contracted to form a relatively constricted passage, so that the flow of liquid to and fro between the fixed volume space in the upper cylinder and the variable space in the lower cylinder, is more or less throttled. The fluid within the cylinder consists of a compressible medium such as air or other gas in the upper portion, and an incompressible medium, such as oil, glycerin, etc., filling the lower portion, preferably to a level above the packing.

The throttling effect at the lower end of the plunger cylinder is rendered asymmetric by means of a check valve adapted to remain normally open on the compression movement of the spring, but to cut off a desired portion of the passage upon the extension movement. By locating the valve below the normal level of the liquid, all of the fluid which passes to and from the fixed volume space is subject to the asymmetric throttling action of the valve. Moreover, the valve is normally below the surface of the liquid when the device is at rest, so that the valve operates initially in the incompressible portion of the fluid medium. The normal internal pressure of the fluid medium is preferably high, but for convenience in practical operation of an automobile, is preferably not higher than can be supplied by an efficient tire pump of the ordinary commercial type.

An important feature of my invention consists in the use of a pump adapted to withdraw any surplus oil which may find its way past the packing of the sliding joint between the cylinders, and to force it back into the interior. Such pump is preferably arranged so as to apply a certain degree of suction between the sliding surfaces of the two cylinders at a point above or on the low pressure side of the packing, and this may serve in certain cases to pump small quantities of air into the cylinder, as well as to collect escaping oil. In cases where the pump is of a capacity adapted to produce any noticeable increase of the internal pressure from this cause, I may provide an adjustable relief valve adapted to permit escape of small quantity of air when the internal pressure exceeds the desired value.

In the preferred form, I arrange an annular groove around the outside of the plunger cylinder at a point just above the packing or on its low pressure side, and form the edges of the groove so that it will tend to collect from the walls of the outer cylinder and drain to the pump intake any oil which may find its way past the joint.

The pump is preferably located within the device, and is operated entirely by the reciprocating movement of the parts when in use. In the particular form shown herein, the end of the throttle valve stem is used as the pump piston, and its reciprocation is caused by the reciprocating movements of the check valve caused by the flow of fluid. The arrangement is such that the pump piston normally closes the intake, so that when the device is not in use reverse leaks are prevented not only by the usual pump valves, but also by the pump piston.

The valve is loosely mounted on the stem, so as to permit a certain amount of lost motion between it and the valve stem. This serves to render the valve more sensitive in its movements, and, moreover, permits the movement in either direction to acquire a certain momentum before it encounters the resistance of the valve stem. This resistance, of course, includes inertia of the stem, sliding friction, and work done in pumping.

The fluid pressure available on the valve for causing the required stroke of the pump may be enormously multiplied without destroying the asymmetric resistance function, by arranging a secondary constriction approximately midway of the path of travel of the valve. By proportioning this constriction to the size of the valve, so as to permit the latter to pass through in either direction with only a small clearance, practically all of the compression and extension efforts on the device when in operation may be efficiently applied to force movement of the valve during its passage through the constriction.

Where a pump is used in accordance with my present invention, the hermetic sealing of the plunger by its packing need not be so perfect as in other cases, but as the device may be required to stand without use for long periods, I have devised an additional expedient for maintaining an adequate body of oil in contact with the packing at all times. To this end, I arrange a supplemental packing below the main packing, and the space between this supplemental packing and the main packing is connected by ducts with a reservoir or trap adapted to contain a supply of oil in a position where it will flow by gravity down into the space between the main and supplemental packings. In this way, the main packing and expanding rings therefor are in effect submerged in oil, regardless of the normal level of the oil in the device. The oil is dashed into the reservoir whenever the device is used, and is there held during periods of non-use. The pressure on both sides of the lower supplemental packing being the same, this packing need be only tight enough to prevent leak of oil by gravity.

A feature of my invention which is of special utility in connection with the initial charging and adjustment of relative amounts of incompressible liquid and of compressible air, is the arrangement of the orifice of the charging pipe or passage at a desired predetermined level in the compression member. When this arrangement is used, the liquid may be charged into the cylinder to a level somewhat greater than is desirable in use. The compressed air may then be introduced through the same or another orifice. When the pressure of the air has been adjusted to suit the load and the parts are in a state of rest, the oil may be blown out through the inlet orifice until escape of air indicates that the orifice has been uncovered and that the oil is at the proper level.

Having thus described the principal features of my invention in such manner as to enable those skilled in the art to practise the same, I will now describe a specific, useful embodiment thereof in connection with the accompanying drawings, in which—

Figure 1 is a vertical central section of the device on the line 1—1, Fig. 3; Fig. 2 is an enlarged detail of the operating parts shown in Fig. 1 with the asymmetric check valve closed and the pump piston in the retracted position; Fig. 3 is an enlarged plan view.

The lower cylinder 1 is hermetically closed at the bottom by screw plug 2 formed with a discharge passage 3 which is normally closed by a screw plug 4. This cylinder provides the variable space 5, which is adapted to be increased or decreased by up or down movements of the plunger cylinder 6. The latter is provided at the upper end with a hermetic screw closure 7. As shown in the drawings, the lower end is screw threaded at 8 to a plunger head provided with constricted fluid passages indicated by the double headed arrow 10.

The main packing of the plunger comprises a seat 11 for a cup washer 12, which is clamped thereagainst by a ring 13 carried by a screw member 14, screw threaded to the central cylindrical wall 15. The free edge of the cup washer is preferably cut square and is continuously spring pressed against the outer cylinder wall by steel spring expanding rings 16, 16. These rings are of sufficient power to maintain the free edge of the cup washer continuously in perfect contact with the cylinder walls. The annular space adjacent the free edge of the cup washer 12, including the space containing the expanding ring 16, is supplied with oil from the annular reservoir 17, 17, by duct 18, formed in the casting, duct 19 passing through clamping ring 13, ducts 20, preferably formed by filing the groove on the back inner ring 16, and duct 21 formed by a similar cut in the bottom of both rings 16. These ducts provide a continuous supply of oil filling all the space adjacent the packing 12 and escape is prevented by means of the supplemental packing 22 arranged below the main packing and held in contact with the walls of the cylinder by expanding ring 23. Escape of oil from the annular reservoir 17 is prevented by the wall 24, so that an abundant supply of oil will remain in the reservoir, even in case the normal level of the oil is below the normal position of the packing, or in case the packing should be lifted above the oil, as might happen in case a large part of the normal load was removed from the device.

The means for applying suction to the sliding contact surfaces in the rear of the main packing is arranged in the plunger head. This means consists of a pump having an intake 25 extending into operative relation with the inner wall of cylinder 1. The intake is preferably supplied through an annular recess or chamber 26 formed or provided with thin edges 26ª and 26ᵇ, adapted to clear the contacting walls of the cylinders of surplus oil. These clearing edges may be rigid, or of resilient or yielding material. The intake is provided with a check valve 27 of any known or desired construction and from this valve the passage 28 leads to the pump cavity 29, whence the oil is discharged through the outlet valve 30 and passage 31 leading to the interior of the device.

The solid head 32 of the pump piston is arranged so as to cover the inlet passage 28 when the plunger is at the end of the expelling stroke. By this arrangement, leak of the pump during periods of non-use is prevented by the plunger 32, as well as by check valves 30 and 27. The pump is operated automatically by relative movement of the parts when in use, and preferably by flow of the fluid medium to and fro between cylinders 1 and 6. In the arrangement shown, the valve 40 is adapted to lift from its seat 41 and permit relative free flow of the fluid medium on the compression stroke and on the return or extension stroke to seat itself, thereby closing passage 42 and forcing the fluid to pass through the relatively smaller passages 43, 43. The effective total area of the passages 43 and the relation of such area to the area of the passage 42, will determine the extent to which the flow to the variable space 5 on the extension stroke will be constricted or throttled as compared with the flow from said space on the compression stroke.

In the form shown herein, I have utilized the forced movements of the valve 40 to operate the pump piston 32, and to this end I have mounted the valve upon an extension of the piston, so that it has a sliding or lost motion play between the collar 44 and the check nut 45. By comparison of Figs. 1 and 2, it will be seen that the freedom of movement of the valve permitted by this lost motion mounting, permits the valve to move freely into close proximity to a secondary constriction 47, which conforms closely to the diameter of the valve, so that there is small clearance and practically the entire compression and extension efforts are available to drive the valve, and through it the pump piston at the moment when the valve passes through said constriction at 47. The upward or discharge movement of the pump is preferably caused or assisted by a tension spring 50, secured to the collar 44 and to the outside of the plunger bearing.

I prefer to arrange an exterior or guard cylinder 51 screwed to the closure of the cylinder 6 and engaging the outside of cylinder 1, at the thickened annular edge 52 and at the lower packing 53. The thickened annular edge 52 is preferably provided with a cushion or packing 54 adapted to perform the function of a buffer whenever the compression stroke is sufficiently violent to drive the flange of closure 7 down into contact therewith. The annular space 56 above packing 54 may be utilized as air compression space, in which air compressed by the movements of 52 may be utilized to maintain an initial pressure greater than atmosphere within the annular space 26.

The arrangements for charging the device with oil and compressed air are preferably located in head 7 of cylinder 6. As shown in Fig. 1, an inlet tube 60 extends down a desired distance, so that its outlet orifice 61 is at or about the desired level of the liquid to be used. The passage of air or liquid through this tube is controlled by a needle valve indicated at 62. As indicated in Fig. 3, there is a passage 64 leading from the needle valve chamber to an inlet check valve 65, which communicates with a screw threaded opening 66, to which may be connected supply pipes for oil or compressed air. In charging the device oil may be introduced either by removing needle valve 62 and substituting an oil supply pipe, or needle valve 62 may be merely loosened and the oil supplied through the opening 66 and check valve 65. After oil has been charged into the device to a suitable height, which is preferably above the level of the orifice 61 of pipe 60, the compressed air is introduced through 66, 65, 64, 60, until the internal pressure is sufficient to support the desired load with the parts approximately in the position indicated in Fig. 1. The air supply is then detached and surplus oil blown out through pipe 60, until the escape of air indicates that its orifice has been uncovered by the lowering of the level of the liquid. If it is found that the device has collapsed an appreciable amount owing to the lowering of the oil level as just described, enough air may be added to bring the parts to the position indicated in Fig. 1.

The plug valve 62 and the plug 67 are then screwed tight and the device is in condition for use.

Where the pumping capacity of the pump described above is sufficient to raise the internal pressure of the device, undue raise of pressure may be prevented by an automatic relief valve, which is diagrammatically indicated in Fig. 3 as comprising a plug valve 70, closing spring 71, and screw adjusting means 72 for adjusting the initial pressure of the spring to thereby predetermine the maximum internal pressure, which may be maintained in the device.

The annular collecting groove or chamber 26 is preferably of considerably greater liquid capacity than would be necessary when the device is in continuous use and the pump in more or less continuous operation. With a groove of the size shown, the device may stand for long periods under very heavy loads and considerable oil may leak through the main packing without the possibility of any oil passing above said collecting groove, which forms a break in the capillary path between the close fitting surfaces of the two cylinders, which break can only be bridged by complete filling of the collecting space. It will thus be evident that up to the capacity of the latter space, the device is proof against ultimate loss of oil or internal pressure, because all oil contained in such space will be returned to the interior of the cylinder by the pump as soon as the latter is put in action by the reciprocating movements of the parts, attendant upon normal active use thereof.

The reservoir oil space 17 is out of the direct path of to and fro movement of fluid, and, hence, the main body of the oil may be churned into foam to a considerable depth while a body of relatively undisturbed oil will remain to cover the ducts 18. Moreover, any foam above the level of 24 will constitute a source of replenishment for reservoir 17 by reason of the oil which will settle out of the foam and flow down into said reservoir.

The liquid used is preferably pure, free flowing, mineral oil, and it may be mixed with pure, perfectly pulverized graphite.

The above described device is provided at both ends with journals 80, 80, adapted to engage pivots of a universal joint comprising pivots arranged at right angles to each other and a coöperating bracket attached to one of the members to be cushioned by said device.

Various features of my invention are adapted for use in other relations where the conditions and functions to be served are similar, as, for instance, in other devices wherein a sliding joint is required to sustain great pressures without leaking; also they may be used as a supplement to or substitute for and may be supplemented or substituted by features set forth in the application of Richard Liebau, Serial No. 468,762, filed December 22nd, 1908.

While I have herein fully shown and described, and have pointed out in the appended claims certain novel features of construction, arrangement, and operation which characterize my invention, it will be understood by those skilled in the art that various omissions, substitutions, and changes in the forms, proportions, sizes, and details of the device and of its operation, may be made without departing from my invention.

I claim:

1. The combination with members having a sliding joint therebetween and forming a chambered device capable of movement for compression and extension, of liquid and gaseous fluids within the chamber, and a pump within said chamber for transferring liquid from said joint to said chamber.

2. The combination with members having a sliding joint therebetween and forming a chambered device capable of movement for compression and extension, of packing for said sliding joint, liquid and gaseous fluids within the chamber and a pump within said chamber for transferring liquid from the rear or low pressure side of said packing to said chamber.

3. The combination with members having a sliding joint therebetween and forming a chambered device capable of movement for compression and extension, of packing for said sliding joint, liquid and gaseous fluids within the chamber, and a pump the operation of which is dependent upon the compression and extension movements, for transferring liquid from the rear or low pressure side of said packing to said chamber.

4. The combination with members having a sliding joint therebetween and forming a chambered device capable of movement for compression and extension, of packing for said sliding joint, a constriction within said chamber substantially midway between its ends when extended, a pump within said chamber, the inlet of which is in operative connection with said sliding joint and the discharge of which connects with said chamber, and means reciprocable through said constriction for operating said pump.

5. A cushion device comprising relatively movable members forming a chamber and having a sliding joint therebetween to permit variation of the volumetric capacity thereof; liquid and gaseous fluids within said device, and a fluid flow actuated pump located within said device having an inlet connection with the sliding joint, and an outlet connection to the interior of the device.

6. A cushion device comprising relatively movable members forming a chamber and having a sliding joint therebetween to permit variation of the volume of the fluid contained therein; liquid and gaseous fluids within said chamber, and a pump located within said chamber and actuated by fluid flow therein to pump fluid into said chamber.

7. A cushion device comprising relatively movable members forming a chamber and having a sliding joint therebetween to permit variation of the volume of the fluid contained therein, liquid and gaseous fluids within said chamber and means for forcibly withdrawing the escaping fluid from the low pressure side of the sliding joint and returning it to the high pressure side.

8. A cushion device comprising a cylinder, a plunger fitted to slide within said cylinder to permit variation of the volumetric capacity thereof, a main packing for the sliding joint between said plunger and cylinder, and a supplemental packing below and adjacent said main packing on its high pressure side, closing in an oil space between the main and supplemental packings, in combination with a collecting cavity for oil on the rear or low pressure side of the main packing and means for applying suction to said collecting cavity.

9. A cushion device comprising a cylinder, a plunger fitted to slide therein to permit variation of the volumetric capacity thereof, a main packing for the sliding joint between said plunger and cylinder, a supplemental packing below and adjacent the main packing on its high pressure side for retaining oil in contact with said main packing, and means for filling the space between said main and supplemental packings with oil at a pressure substantially equal to the pressure within said cylinder.

10. A cushion device comprising a cylinder, a plunger fitted to slide therein to permit variation of its volumetric capacity, a main packing for the sliding joint between said plunger and cylinder, a supplemental packing adjacent the main packing on its high pressure side forming a space for retaining oil in contact with the high pressure side of the main packing, and means for filling said space with oil at a pressure substantially equal to the pressure within the cylinder, in combination with means for applying suction to the sliding joint on the low pressure side of the main packing.

11. A cushion device comprising a cylinder, a plunger fitted to slide therein to permit variation of the volumetric capacity thereof, a main packing for the sliding joint between said plunger and cylinder, a supplemental packing below and adjacent the main packing on its high pressure side for retaining oil in contact with said main packing, and a reservoir above said main packing for supplying the space between said main and supplemental packings with oil at a pressure substantially equal to the pressure within said cylinder.

12. A cushion device comprising a cylinder, a plunger fitted to slide therein to permit variation of its volumetric capacity, a main packing for the sliding joint between said plunger and cylinder, a supplemental packing adjacent the main packing on its high pressure side forming a space for retaining oil in contact with the high pressure side of the main packing, means for supplying said space with oil at a pressure substantially equal to the pressure within the cylinder, a collecting chamber on the low pressure side of the main packing, and means for applying suction to said collecting chamber.

13. A cushion device comprising relatively movable members forming a closed chamber and having a sliding joint to permit variation of the volume of the fluid contained therein, liquid and gaseous fluids within said chamber arranged so that a body of the liquid fluid is maintained in contact with the sliding joint on its high pressure side, and means within said chamber for applying suction to the rear portion or low pressure side of said sliding joint.

14. A cushion device comprising relatively movable members forming a closed chamber having a sliding joint to permit varying the volume of the fluid contained therein, liquid and gaseous fluids within said chamber arranged so that a body of liquid is maintained in contact with the high pressure side of the sliding joint, and a pump having intake connection with the sliding joint and an outlet connection with said chamber.

15. A cushion device comprising relatively movable members forming a closed chamber, having a sliding joint to permit varying the volume of the fluid contained therein, an agent for applying suction to the rear portion of the sliding joint, and means for utilizing the relative movement of said members for operating said agent.

16. A cushion device comprising a cylinder, a member having sliding engagement with said cylinder to permit variation of the volumetric capacity thereof, a packing for the sliding joint between said member and cylinder, and means within said cylinder for applying suction to the sliding joint on the rear or low pressure side of said packing.

17. A cushion device comprising a cylinder, a member having sliding engagement with said cylinder to permit variation of the volumetric capacity thereof, a packing for the sliding joint between said member and cylinder, and means within said cylinder for removing material from the sliding joint and forcing it into said cylinder.

18. A cushion device comprising telescopically arranged cylinders, a packing for the sliding joint between said cylinders, a constriction adjacent said packing, an agent arranged to be forcibly moved by fluid flowing through said constriction upon relative movements of said cylinders, and a pump operated by said agent and having an intake connection on the rear or low pressure side of said packing, and an outlet connection to the chamber formed by said cylinder.

19. A cushion device comprising a cylinder, a member fitted to slide longitudinally of said cylinder to permit variation of the volumetric capacity thereof, a packing for the sliding joint between said member and cylinder, a constricted passage for flow of the fluid within the device, a check valve arranged to be forcibly moved by fluid flowing through said passage upon relative movement of said cylinder and member, and a pump operated by said check valve, having an intake on the rear or low pressure side of said packing and an outlet communicating with the interior of said cylinder.

20. A cushion device comprising in combination, telescopically arranged cylinders, a plunger device carried by one of said cylinders, a packing for the sliding joint between said cylinders carried by said plunger device, and a pump adapted to be operated by the flow of fluid through said plunger device to apply suction to said sliding joint on the low pressure side of said packing.

21. A cushion device comprising in combination, two cylinders concentrically arranged and secured to a head member, a cylinder provided with one closed end and arranged to slide between said two cylinders, a packing for the sliding joint between the inner of said two cylinders, and a pump within the chamber formed by said two inner cylinders for applying suction to said sliding joint on the rear or low pressure side of said packing.

22. A cushion device comprising relatively movable members forming a chamber and having a sliding joint therebetween to permit variation of the volumetric capacity thereof, liquid and gaseous fluids within said chamber arranged so that the only fluid which can escape through said joint would be essentially liquid, and means for forcibly returning the escaped fluid into said chamber.

23. A cushion device comprising relatively movable members forming a chamber and having a sliding joint therebetween to permit variation of the volumetric capacity thereof, liquid and gaseous fluids within said chamber arranged so that the only fluid which can escape through said joint will be essentially liquid, and means for automatically returning the escaped fluid into said chamber.

Signed at New York city, in the county of New York and State of New York, this 27th day of September, A. D. 1909.

GEO. WESTINGHOUSE.

Witnesses:
WM. H. CAPEL,
H. C. TENER.